(12) United States Patent
Sap

(10) Patent No.: US 8,567,971 B2
(45) Date of Patent: Oct. 29, 2013

(54) UTILITY VEHICLE REAR-VIEW MIRROR

(75) Inventor: Bruno Sap, Beauvais (FR)

(73) Assignee: AGCO SA, Beauvais (FR)

(*) Notice: Subject to any disclaimer, the term of this patent is extended or adjusted under 35 U.S.C. 154(b) by 28 days.

(21) Appl. No.: 13/272,510

(22) Filed: Oct. 13, 2011

(65) Prior Publication Data

US 2012/0092781 A1    Apr. 19, 2012

(30) Foreign Application Priority Data

Oct. 14, 2010    (GB) .................................... 1017374.8

(51) Int. Cl.
    *G02B 7/182*    (2006.01)
(52) U.S. Cl.
    USPC .......................................................... 359/871
(58) Field of Classification Search
    USPC ........................... 359/841, 843, 871, 872, 877
    See application file for complete search history.

(56) References Cited

U.S. PATENT DOCUMENTS 8,042,959 B2 * 10/2011 Maxwell et al. ............... 359/841

FOREIGN PATENT DOCUMENTS

| DE | 2841974 A1 | 4/1980 |
| DE | 4134644 A1 | 5/1992 |
| DE | 4414670 A1 | 9/1995 |

OTHER PUBLICATIONS

Great Britian Search Report for Application No. 1017374.8 dated Feb. 2, 2011.

* cited by examiner

*Primary Examiner* — Euncha Cherry

(57) ABSTRACT

A rear-view mirror assembly is mounted to the side of a utility vehicle cab which comprises a door hinged to a front pillar of the cab. The assembly comprises a mirror support bracket for supporting a rear-view mirror in a position which at least partly resides within a swept volume of the door. The support bracket is pivotally mounted to the cab and a rod is connected between the support bracket and the door. The mirror pivots upwardly to a position outside said swept volume as the door is opened, effectively 'leapfrogging' the door.

9 Claims, 3 Drawing Sheets

UTILITY VEHICLE REAR-VIEW MIRROR

CROSS-REFERENCE TO RELATED APPLICATION

The present application claims the benefit of and priority from United Kingdom Application No. 1017374.8, filed Oct. 14, 2010, the entire disclosure of which is hereby incorporated by reference.

FIELD OF THE INVENTION

The invention relates to rear-view mirrors which are mounted externally of a utility vehicle which comprises a cab with a door hinged to a front pillar, the mirror allowing a driver to see beyond their peripheral field of vision, especially behind and to the side of the vehicle. In particular, but not exclusively so, the invention relates to rear-view mirrors which are suitable for fitting externally to tractors.

BACKGROUND

As required for most vehicles driven on highways in the developed world, utility vehicles must have fitted thereto some form of rear-view mirror which enables the driver to view traffic following behind without turning their head away from looking at the road ahead. In fact, rear-view mirrors fitted to utility vehicles, particularly tractors, are used for purposes beyond safety. For example, when reversing a long trailer into a limited space side-mounted rear-view mirrors are often used to aid the driver's visibility of the trailer sides behind.

Many utility vehicle cabs have doors fitted to one or two sides of the cab in a manner such that each door pivots around a front pillar (A-pillar) of the cab. Such an arrangement is synonymous with car and truck doors. However, such front mounting of the door presents several problems when designing the mounting of rear-view mirrors which are normally located in the volume of space swept by the door when moved between a closed and an open position.

In one known attachment method, the rear-view mirror is attached by a bracket directly to the cab frame. However, this arrangement limits the extent to which the door can open as the mirror permanently resides in the swept envelope of the door and thus presents an obstruction. This can severely restricts the doorway width through which the driver can enter and exit the cab.

In an alternative known method of attachment the rear-view mirror is attached by a bracket to the door itself. Although this arrangement causes the mirror to move with the door, thus allowing the door to be opened more widely, two disadvantages still prevail. Firstly, the door cannot be opened fully back on itself because movement of the mirror is restricted by the windscreen. Secondly, the rear-view mirror is not positioned in an operating position when the door is fully opened thus requiring the door to be fully closed when reversing a trailer for example.

SUMMARY OF INVENTION

It is an object of the invention to provide a rear-view mirror assembly for a utility vehicle having a front hinged door to be moved to a fully opened position.

It is another object of the invention to provide a rear-view mirror assembly which positions the mirror in an operating position when the front-hinged door is in a fully open position.

In accordance to the invention there is provided a utility vehicle comprising a cab with a door hinged to a front pillar, and a rear-view mirror assembly comprising a mirror support bracket for supporting a rear-view mirror in a position which at least partly resides within a volume swept by the door when moved between a closed position and an open position, the support bracket being pivotally mounted to the cab, and a rod connected between the support bracket and the door so that the mirror pivots upwardly to a position outside said swept volume as the door is opened. Advantageously, by pivotally mounting the support bracket to the cab the mirror can be forced by the connecting rod into a position outside of the swept volume of the door thus allowing the door to be fully opened without disruption. This delivers the benefits of a wider doorway providing safer entrance and exit to the cab for the driver.

Preferably the mirror at least partly resides within the door's swept volume both when the door is in the open and closed position. In such an arrangement the mirror effectively 'leapfrogs' the door when moving between an open and a closed position. Taking this further, the mirror is preferably supported in an operating position when the door is both in the open position and the closed position. Advantageously, this allows the driver to utilise the minor even when the door is in a fully open position.

The rod is preferably connected to the support bracket by a ball joint which permits increased design flexibility when positioning the mirror. Likewise, the rod is preferably connected to the door by a ball joint for the same reason.

One end of the rod is connected relative to the door and, for example, the door may comprise a laterally extending hinge member which presents a suitable attachment point for said rod. Alternatively, said one end of the rod may be connected to a door frame.

In one arrangement the support bracket comprises an inner element which is pivotally mounted relative to the cab and an outer element for supporting the side-view mirror. Pivotal movement between the outer and inner elements around a generally vertical axis allows for adjustments to be made to the driver's view. Advantageously further still, the inner element can form part of a mirror attachment kit to which any conventional rear-view mirror bracket can be attached.

BRIEF DESCRIPTION OF THE DRAWINGS

Further advantages of the invention will become apparent from the following description of a specific embodiment with reference to the appended drawings in which.

DESCRIPTION OF EXAMPLE EMBODIMENT

Figure 1:
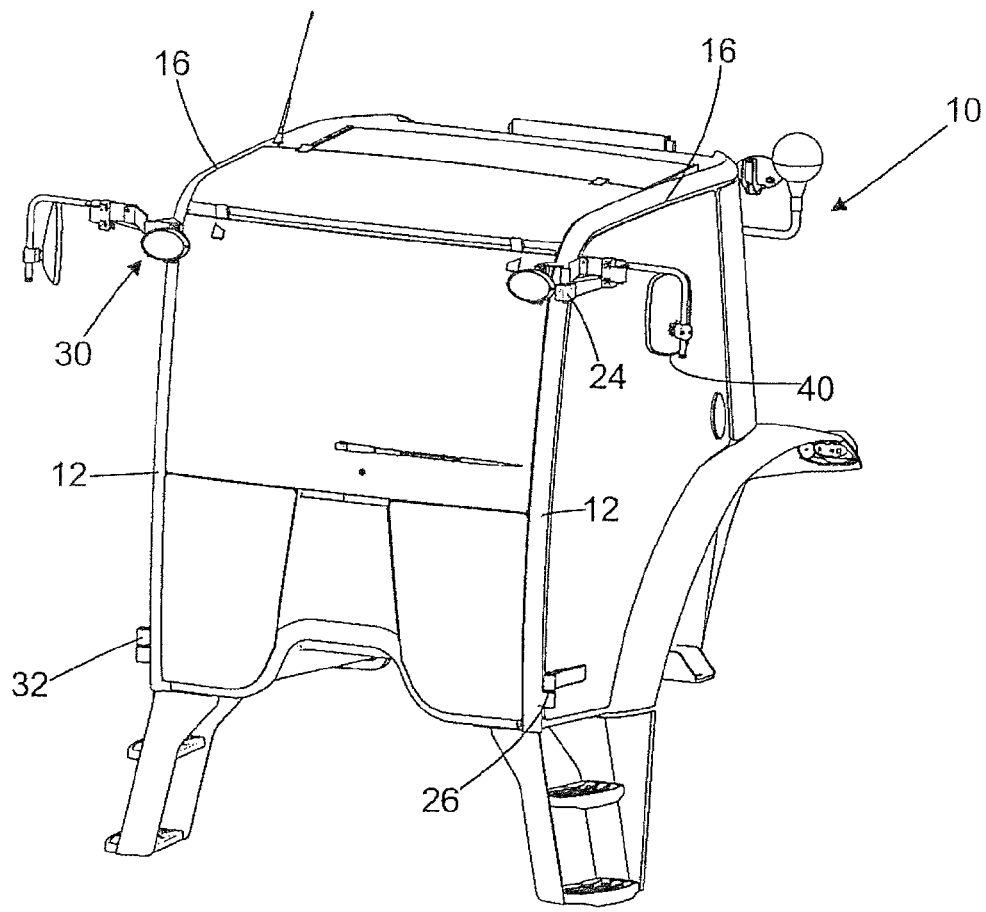
FIG. 1 is a perspective view of a tractor cab comprising two rear-view mirror ensembles in accordance with the invention.

With reference to the drawings, a tractor cab 10 comprises a ROPS structure which includes two front pillars (A-pillars) 12, two rear pillars (C-pillars) 14, longitudinal roof members 16 and front and rear transverse roof members 18, 20. A left-hand door 22 is hingeably attached to a prospective front pillar 12 by two hinges 24, 26 (FIG. 1). Likewise, a right-hand door 28 is hingeably attached to the right-hand front pillar by two hinges 30, 32. Each hinge 24, 26, 30, 32 comprises a tractor part and a door part. This can be seen in FIG. 5 in which the tractor part 30a is secured by welding or riveting, for example, to the front pillar 12 and includes a downwardly extending stub 31a. The door part 30b includes a vertical bolt into which the stub 31a is inserted for pivotal movement therein. The door part 30b of hinge 30 is integrated into a door support member 34 which comprises a horizontal member secured to door 28 formed of glass or other transparent material.

The door part of hinge 32 (not shown) includes an upwardly extending stud which is inserted into a corresponding bolt secured to the door 28. The combination of the upwardly and downwardly extending stubs ensures that the door 28 remains attached to the tractor for pivoting motion around a generally vertical axis which corresponds to opening and closing thereof. Left-hand door 22 is secured to the respective front pillar 12 in a similar manner.

It should be appreciated that the exact construction of the door may vary from that described without deviating from the scope of the invention.

Turning to the construction of the mirror attachment assembly it should be understood that the construction for the left-hand and right-hand mirrors is the same save for the handed nature of construction. As such the same reference numbers will be used for both left-hand and right-hand components.

A conventional rear-view mirror 40 is secured via a gripping element 42 to an L-shaped shaft 44 which is pivotally mounted to an attachment bracket 46 wherein the L-shaped shaft 44 can pivot around a generally vertical axis relative to the attachment bracket 46 (and ultimately the cab 10) allowing for adjustment of the mirror 40. For finer adjustment of the mirror 40 the gripping element 42 can be utilised as per known mirror attachment assemblies.

Figure 5:
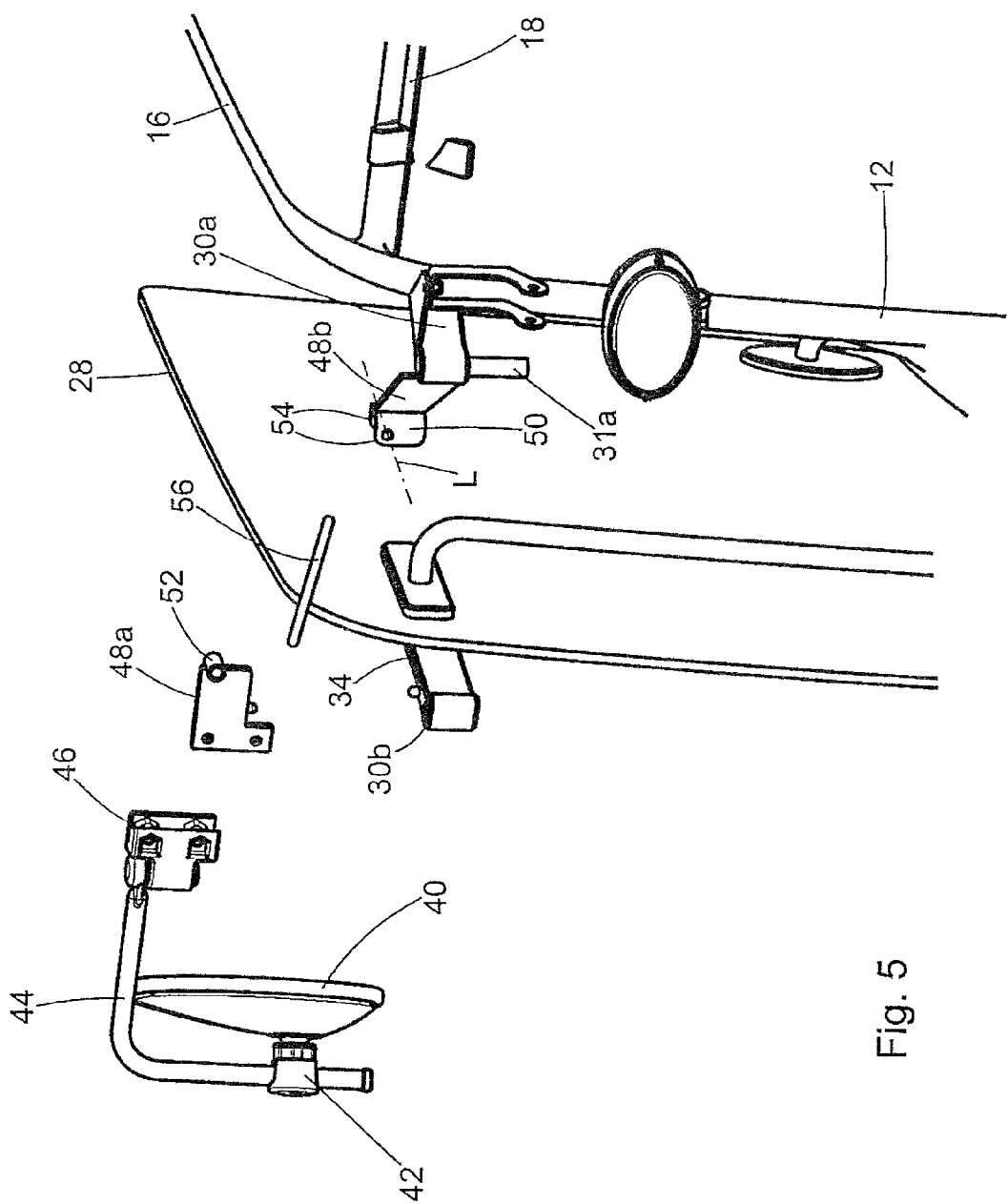

The attachment member 46 is bolted to an outer element 48a of a support bracket 48. An inner element 48b of support bracket 48 is secured to the associated front pillar 12 by welding or otherwise. The inner element 48b comprises a vertical jaw 50 which receives an inner edge of outer element 48a which is pivotally attached to inner element 48b by a shaft 52 which rotates within holes 54 formed in the jaw 50. This permits movement of the mirror 40 around a generally longitudinal axis L (FIG. 5).

Figure 2:
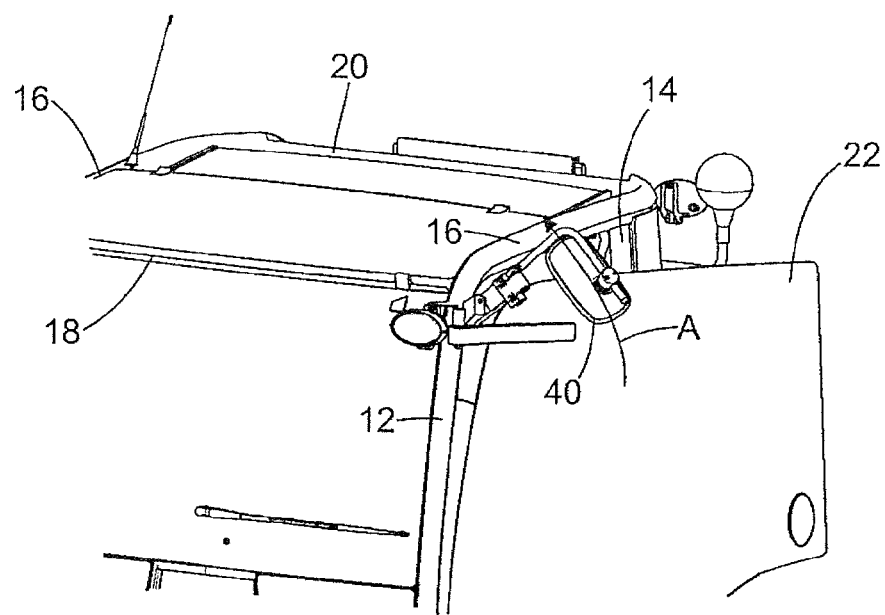
FIG. 2 is an enlarged perspective view of the cab of FIG. 1 showing the left-hand door in a partly opened position.
Figure 3:
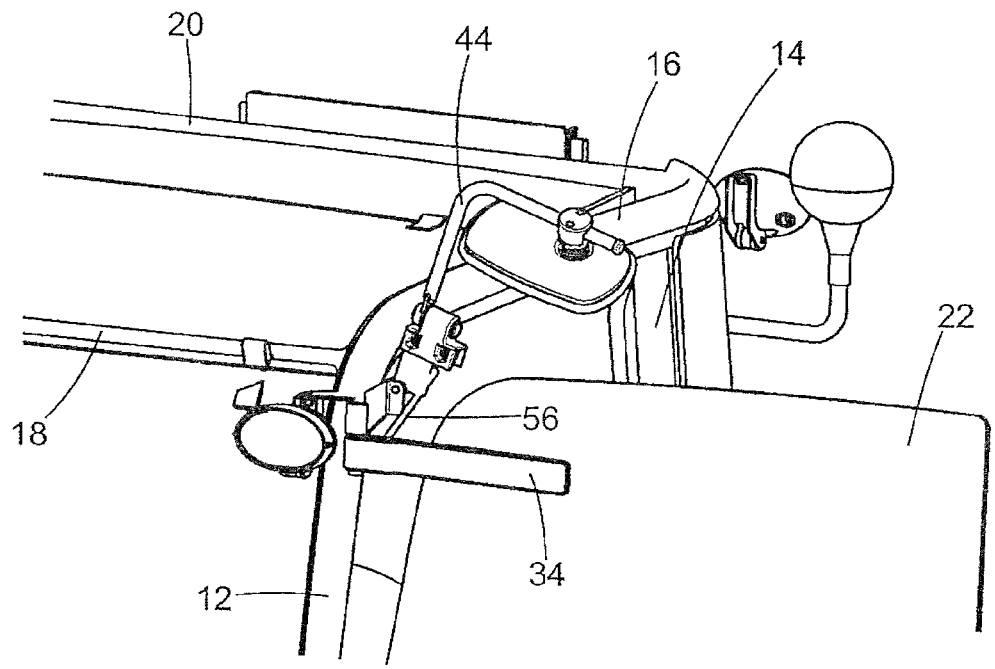
FIG. 3 is an enlarged perspective view of the cab of FIG. 1 showing the left-hand door in a partly open position beyond that shown in Figure two.
Figure 4:
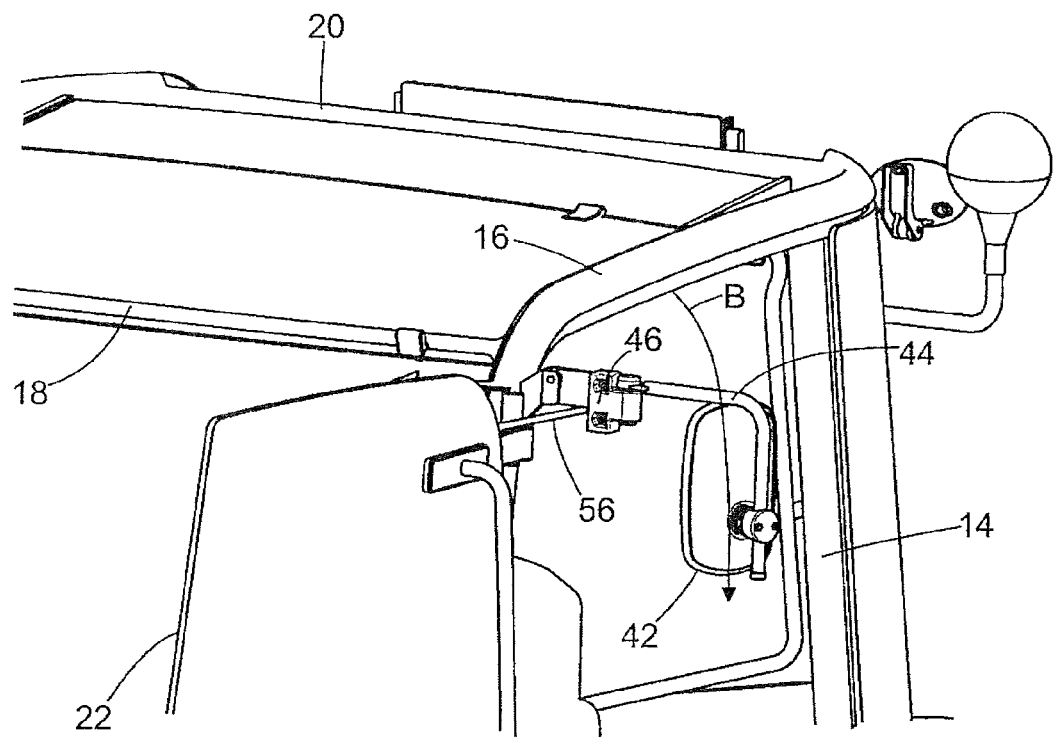
FIG. 4 is a perspective view of the utility vehicle cab of FIG. 1 showing the left-hand door in a fully open position and FIG. 5 is an enlarged perspective view of the utility vehicle cab of FIG. 1 showing the components of the door and the mirror assembly in exploded form.

A rod 56 is pivotally connected at one end to outer element 48a by a ball joint (not shown) and at an inner end to door support member 34 by another ball joint (also not shown). The rod 56 serves to force the outer element 48a (together with the attached mirror assembly 40, 42, 44 46) upwardly around longitudinal axis L as door 22, 28 is moved from a fully closed position (FIG. 1) through an intermediate position (FIGS. 2 and 3) to a fully open position (FIG. 4).

Describing in more detail the sequence of door movement starting with FIG. 1, the left-hand door is shown in the fully closed position whilst the left-hand mirror 40 is held in an operating position so it can be used by the driver. As can be seen from FIG. 2, and highlighted by arrow A, mirror 40 moves upwardly in an arc as door 22 moves to a partly open position. The length of rod 56 is chosen so that the mirror 40 is moved outside of the swept volume of door 22 to enable door 22 to pass thereunder as shown in FIG. 3. As the movement of door 22 continues to the fully open position of FIG. 4, the mirror 40 is lowered once again to an operating position in a motion path indicated by arrow b. Such movement is permitted by ball joints (not shown) connecting the rod 56 at each end.

It will be understood that the mirror 40 leapfrogs the door 22 in the same manner as the door 22 is moved from a fully open position to a fully closed position.

The invention claimed is:

1. A utility vehicle comprising a cab a door hinged to a front pillar of the cab, and a rear-view mirror assembly comprising a mirror support bracket for supporting a rear-view mirror in a position which at least partly resides within a volume swept by the door when the door is moved between a closed position and an open position, the support bracket being pivotally mounted on the front pillar, and a rod connected between the support bracket and the door so that the mirror pivots upwardly to a position outside said swept volume as the door is opened.

2. A utility vehicle according to claim 1, wherein the mirror at least partly resides within said swept volume when the door is both in the open position and the closed position.

3. A utility vehicle according to claim 2, wherein the mirror is supported in an operating position when the door is both in the open position and the closed position.

4. A utility vehicle according to claim 1, wherein the rod is connected to the support bracket by a ball joint.

5. A utility vehicle according to claim 1, wherein the rod is connected to the door by a ball joint.

6. A utility vehicle according to claim 1, wherein the door comprises a hinge member to which the rod is connected.

7. A utility vehicle according to claim 1, wherein the support bracket comprises an inner element which is pivotally mounted relative to the cab and an outer element for supporting the side view mirror.

8. A utility vehicle according to claim 7, wherein the outer element can pivot relative to the inner element around a generally vertical axis to allow for adjustments to be made to a driver's view.

9. A utility vehicle according to claim 7, wherein the outer element comprises an L-shaped shaft to which the mirror is fixed.

* * * * *